Dec. 7, 1926. 1,609,754
C. A. McCOLLUM
UNLOADING MECHANISM FOR CENTRIFUGAL DRIERS
Filed June 25, 1923 2 Sheets-Sheet 1

Witnesses:
Edwin Trueb

Inventor:
CALEB ADDISON McCOLLUM,
By:
D. Anthony Usina
his Attorney.

Dec. 7, 1926.  1,609,754
C. A. McCOLLUM
UNLOADING MECHANISM FOR CENTRIFUGAL DRIERS
Filed June 25, 1923   2 Sheets-Sheet 2

Witnesses:
Edwin Trueb

Inventor:
CALEB ADDISON McCOLLUM,
by D Anthony Usina
his Attorney.

Patented Dec. 7, 1926.

1,609,754

UNITED STATES PATENT OFFICE.

CALEB ADDISON McCOLLUM, OF CLAIRTON, PENNSYLVANIA; FLORENCE WOODS McCOLLUM EXECUTRIX OF CALEB ADDISON McCOLLUM, DECEASED.

UNLOADING MECHANISM FOR CENTRIFUGAL DRIERS.

Application filed June 25, 1923. Serial No. 647,638.

This invention relates to unloaders for centrifugal driers and more particularly to plow unloaders for centrifugal driers of the bottom discharge type, and has for its primary object the provision of an unloader that is carried entirely on the housing stand of the drier and may be swung clear of the drier basket when desired.

Another object is to provide an improved form of unloader having the novel combination, construction and design of parts hereinafter described in detail and illustrated in the accompanying drawings.

Figure 1:
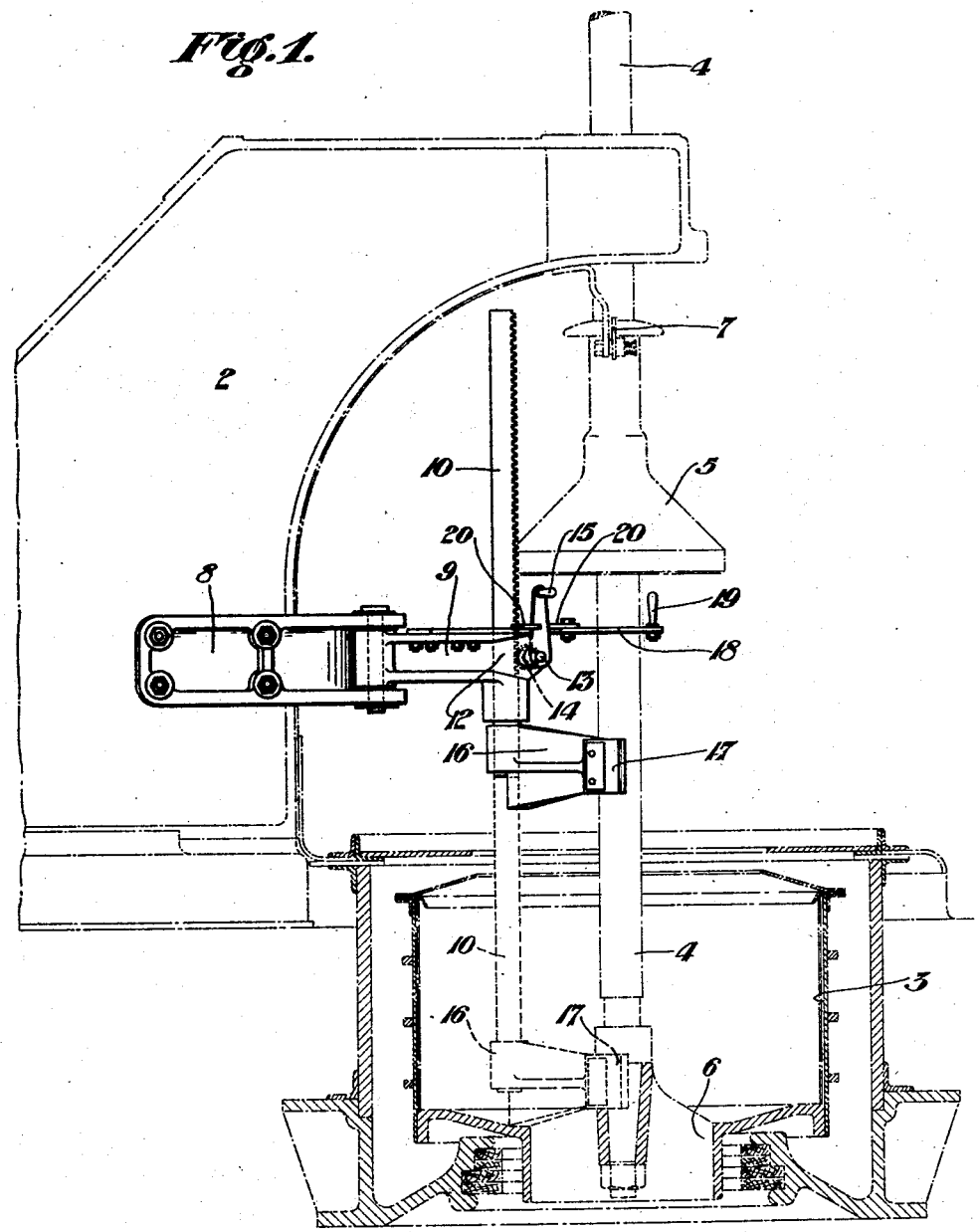

In the drawings, Figure 1 is a side elevation, partly in section, of a drier having my invention applied thereto, the drier being shown in skeleton and parts being omitted for the sake of clearness.

Figure 2:
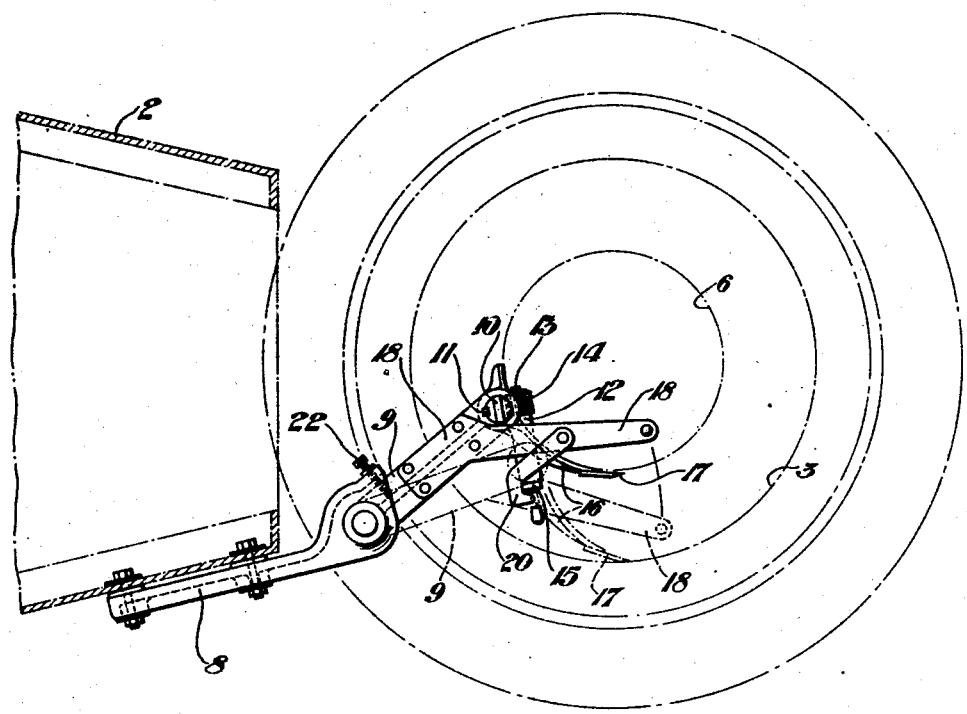

Figure 2 is a top plan of the drier of Figure 1 with the unloader mounted thereon.

Referring more particularly to the drawings, the numeral 2 designates the housing stand of a drier of well known construction, which stand is adapted to carry suitable pulleys and other operating mechanism (not shown) for operating the centrifugal drying basket 3 carried on the lower end of shaft 4. A suitable bell 5 is slidably mounted on the shaft 4 and is adapted to be lowered to close the bottom discharge port 6 when the drier is in operation and to be raised to the position shown in Figure 1 and held by catch 7 when it is desired to discharge the dried material from the basket.

The unloader of this invention is carried entirely on the housing stand 2 and comprises a rigid bracket 8 bolted or otherwise rigidly secured to the housing stand 2 and projecting forwardly therefrom toward the basket 3 and having a horizontally disposed arm 9 pivotally secured to its forward end, which is adapted to have a horizontal swinging movement relative thereto. The forward end of the arm 9 is provided with an aperture in which is mounted a vertically disposed rack bar 10. The bar 10 is prevented from turning by a key 11 mounted in co-operating slots in the arm 9 and bar 10 which form a keyway.

The forward end of the arm 9 is enlarged to form a bearing 12 for a shaft 13, which is provided with a pinion 14 on one end and a crank handle 15 on the other end. The pinion 14 is meshed with the teeth on the rack bar 10 and rotation of the shaft 13 is adapted to cause vertical movement of the bar 10.

A plow 16 is rigidly secured on the lower end of rack bar 10 and is provided with nose or cutting tip 17.

An operating lever 18 is rigidly secured to the arm 9 and is provided with a handle or grip 19 at its free end. In operating the unloader the operator will grasp the grip 19 of lever 18 to swing the arm 9, bar 10 and plow 16 horizontally. A latch bar 20 is pivotally secured to the lever 18 and is adapted to be engaged with the crank handle 15 on shaft 13 to hold said handle in an upright position and thus prevent rotation of said shaft and consequent vertical movement of the rack bar 10.

An adjustable stop screw 22, mounted in the bracket 8, is adapted to limit the swinging movement of the arm 9.

In operation, after the material in the basket has been sufficiently dried by the centrifugal action of the drier, the revolving basket 3 is slowed down and the bell 5 is raised to uncover the discharge opening 6 in the bottom of the basket. The swing unit composed of arm 9, bar 10 and plow 16, etc., is then swung forward until the arm 9 engages stop screw 22, at which time the plow 16 is in proper position to be lowered into the basket. Latch 20 is then released and the operator controls the vertical movement of the plow with one hand by operating the handle 15 on shaft 13, while he feeds the plow into the material by pulling on the lever 18 with his other hand. The material is thus cut down and falls through the bottom discharge port 6 of the basket.

An unloader constructed in accordance with this invention, besides having an improved operation over those of the prior art, also has the added advantage of being capable of being swung clear of the basket 3 when not in use, and thus not interfering with any adjustments or repairs of the basket.

While I have shown and described one particular embodiment of my invention, it will be understood that I do not wish to be limited thereto, since various modifications may be made without departing from the scope of my invention as defined in the appended claims.

I claim:—

The combination with a centrifugal drier comprising a housing stand, and a centrifugal drying basket having a bottom discharge opening, of an unloader for said basket comprising a fixed horizontal bracket secured to said housing and having its free end projecting toward but terminating short of said basket, a horizontal arm pivotally secured to the free end of said bracket and adapted to have a limited horizontal swinging movement relative thereto, said arm being provided with an aperture adjacent its forward end, a vertically disposed slotted rack bar mounted in said aperture and adapted to be moved vertically relative to said arm, means for limiting the movement of said arm, means for preventing the rotation of said bar, a shaft mounted in suitable bearings on said arm, a pinion on one end of said shaft in mesh with said rack bar, a crank handle on said shaft, a rigid lever secured to said arm and provided with a hand hold adapted to be grasped to swing said arm and mechanism carried thereby, a latch pivotally mounted on said lever and adapted to engage and lock said crank handle in upright position and thus hold said shaft against rotation, and a plow rigidly secured to the lower end of said bar and adapted to have a combined vertical and horizontal movement into the material to be unloaded, due to the horizontal movement of said arm and vertical movement of said bar.

In testimony whereof I have hereunto set my hand.

CALEB ADDISON McCOLLUM.